United States Patent [19]

Lovness

[11] 4,119,429
[45] Oct. 10, 1978

[54] SOIL SUPPLEMENT

[75] Inventor: Donald E. Lovness, Stillwater, Minn.

[73] Assignee: Judd Ringer Corporation, Eden Prairie, Minn.

[21] Appl. No.: 807,837

[22] Filed: Jun. 20, 1977

Related U.S. Application Data

[63] Continuation-in-part of Ser. No. 667,655, Mar. 17, 1976, abandoned.

[51] Int. Cl.$^2$ ............................................. C05F 11/08
[52] U.S. Cl. ...................................... 71/6; 71/64 C; 71/64 SC; 71/DIG. 2; 195/111
[58] Field of Search ............... 71/1, 6, 7, 64 A, 64 R, 71/64 C, 64 SC, DIG. 2; 195/111

[56] References Cited

U.S. PATENT DOCUMENTS 3,714,063  1/1973  Salamone .............................. 71/6 X

OTHER PUBLICATIONS

Basic Bacteriology–Its Biological and Chemical Background, Lamanna et al., 1953, p. 271.

Primary Examiner—Charles N. Hart
Assistant Examiner—Ferris H. Lander
Attorney, Agent, or Firm—Frederick E. Lange

[57] ABSTRACT

A soil supplement for addition to potted plants consisting of microorganisms, enzymes, and various substances rich in protein and carbohydrates including bone meal, torula yeast, potassium citrate, soybean flour and durum wheat flour. The potassium citrate acts as a chelating or sequestering agent. The substance is used in connection with the water used to moisten the soil of the potted plant. The effect of adding the supplement to the soil is that the microorganism count greatly increases due to the microorganisms and enzymes acting on the various substances rich in protein and carbohydrates. The sequestering agent tends to maintain the solution in suspension through the earth. As water and/or the supplement are added to the soil from time to time, any salts accumulated on the surface of the soil or on the edge of the pot are gradually sequestered into the soil and are ionized by the action of the enzymes and microorganisms to produce minerals useful for the plant. The microorganisms break down any dead root structure, giving the live roots more room. After continued use, the soil around the plant becomes light and porous.

A preferable composition is from 1 to 2 percent of microorganisms, 2 to 10 percent of enzymes, 5 to 20 percent of bone meal, 15 to 30 percent of torula yeast, 8 to 15 percent of potassium citrate, 5 to 15 percent soybean flour, and 30 to 60 percent of durum wheat.

15 Claims, No Drawings

SOIL SUPPLEMENT

This invention is a continuation-in-part of the co-pending application of the applicant, Ser. No. 667,655, filed Mar. 17, 1976, now abandoned.

BACKGROUND OF THE INVENTION

In growing plants indoors and in containers such as pots, problems are encountered which are not present when the same plants are grown outdoors. Due to the unnatural environment of a relatively small container and indoor conditions, various problems arise. For example, various salts such as sodium carbonate, calcium carbonate and sodium chloride present in the water used to water the plants eventually is deposited on the sides of the container and on the surface of the soil. Under normal conditions outdoors, this salt would be sequestered through the soil, enriching the same.

Also, the soil in the pot becomes crustly and contracts from the sides of the pot. The aeration is restricted and the soil's moisture holding capacity is reduced. This can lead to root binding, as the roots try to reach whatever moisture is available in the drainage area on inside surfaces of the pot but farthest from the center root cluster. The problem is not solved by the simple addition of normal fertilizers. While these supply certain necessary nutrients to the plants, they do not result in the soil becoming more moist and porous and capable of handling the salts introduced by repeated watering. In fact, some of these fertilizers introduce salts of their own which may also be deposited on the pot and on the surface of the soil.

Part of the problem is that the normal symbiotic relationship that exists is destroyed. In the natural cycle, old plant material of various kinds is broken down by microorganisms present in the soil and this results in carbohydrates being formed. The carbohydrates provide the energy source for the microorganisms to build protein. The growth of the microorganisms and enzymes that normally takes place creates a very large cation exchange capacity for the storage of nutrients for both the plant and microorganisms. Where the plant is in a pot, the amount of old plant material is very limited and sooner or later the microorganisms and enzymes will gradually disappear due to lack of nutrient material for the microorganisms. The result will be that this normal symbiotic relationship is broken down and the soil ceases to become "living" soil.

The result is that, in many cases, after a potted plant becomes so old, it is discarded and replaced by a new plant, despite the fact that the plant itself is often perfectly capable of further growth if the soil were in proper condition.

SUMMARY OF THE PRESENT INVENTION

The present invention is concerned with a soil supplement in which a small amount of microorganisms and enzymes is introduced along with materials rich in protein and carbohydrates and a sequestering agent for maintaining the remaining ingredients dispersed in the soil and preventing the settling thereof. This material is introduced by mixing a quantity of the same with the water that is used to water the plants. This may be done either by mixing the supplement with the water and adding the mixture to the soil or by placing the supplement on the soil and then adding water to the soil. When this is done periodically, the salts that have been deposited in the soil and on the sides of the pot are gradually sequestered into the soil and disappear. At the same time, the microorganisms and enzymes multiply rapidly due to the proteins and carbohydrates present. This, in turn, will result in the microorganisms and enzymes breaking down dead roots and other inert organic material into simple organic forms which can be utilized by the plants to complete their cycle. Colloids and gels are also produced to help maintain desirable substances that otherwise might be leached out by watering.

Among materials rich in proteins and carbohydrates which have been found satisfactory are bone meal, Torula yeast, soybean flour and durum wheat flour. Bone meal is rich in tricalcium phosphate. The Torula yeast has a high percentage of protein as well as a substantial amount of carbohydrates and various trace elements, the soybean flour is high in protein and carbohydrates, and the durum wheat is also provided as a source of protein and carbohydrates although it is less rich in protein than the soybean flour.

Among the sequestering agents which have been found desirable are potassium citrate which not only acts as a sequestering agent but also as a source of potassium.

The microorganisms produce nitrogen from the protein and also produce phosphorous, potassium and vital trace elements from the organic material essential to the growth of the plants. The result is that in a short time after the use of the material of my invention, the soil in a potted plant will have a looser particle texture, a rich dark brown color, and a fresh aroma typical of plowed farmland in the spring.

Various other features and objects of the invention will be apparent from a consideration of the accompanying specification and claims.

DESCRIPTION OF PREFERRED EMBODIMENT

As pointed out above, my soil supplement includes a relatively small amount of certain microorganisms, a relatively small amount of enzymes, a sequestering agent, and a substantial amount of material rich in protein and carbohydrates. Among such materials are bone meal which is rich in tricalcium phosphate, Torula yeast which has a high percentage of protein, soybean flour which is high in both protein and carbohydrate content, and durum wheat flour which, while less rich in protein than the soybean flour, does provide a good source of proteins and carbohydrates.

While a wide variety of substances may be used in the soil supplement, I have found the following range of substances to be very satisfactory.

Microorganisms—1 to 2% of 15 to 20 billion cell count per gram of microorganisms of the group consisting of: Azobacter, Pseudomonadaceae, Actinomycetes, Streptomycetacesae, gram negative Chemolithotropics, Bacillaceae, Norcardiaceae, Phycomycetes, Ascomycetes, Basidiomycetes, Fungi imperfecti, Zygomycetes, and a nitrofying bacteria oxidizing type of microorganism such as Nitrosomonas or nitro bacter. It is preferable that the amount of Azobacter and Actinomycetes be about 1/15 of the total other enzymes.

Enzymes—2 to 10% of enzymes of the group consisting of: Cellulase, Hemicellulase, Protease, Amylase, Phenyloxgenase, Peroxygenase, Cytase, Pentosonase, Lipase, and waxolytic enzymes.

Bone meal—5 to 20%;

Torula dried yeast—from 15 to 30%;

Potassium citrate—from 7 to 15%;
Soybean flour—5 to 15%;
Durum wheat—30 to 60%.

The microorganisms are identified, cultured and grown by known biological practice. The enzymes are identified by known specific substrates. They are produced in connection with the microorganisms with which they are associated.

In the above mixture, the Torula yeast is a yeast which has been inactivated. Such a yeast is not only very high in protein but also contains substantial B complex vitamin factors as well as various trace elements. Another yeast which may be employed is *Saccharomyces cerevisae.*

In place of the durum wheat, alfalfa flour having a minimum 15 to 20 percent protein content may be employed. About the same proportion of alfalfa flour may be used as set out above for the durum wheat. Similarly, clover meal having a minimum of 15 to 20 percent protein content may likewise be employed. Similarly, this may be used in about the same proportion as the durum wheat. It is also possible to employ soyabean hay in place of the durum wheat flour. In this case, because the soyabean hay is very rich in protein, only about 15 to 30 percent of this is necessary. Another substance which may be used is corn germ meal. In this case, 10 to 20 percent of the meal is adequate. Cottonseed meal and mustard meal are also alternatives which may be employed. In such cases, they will be employed in about the same relative quantities as suggested above for durum wheat.

These substances are thoroughly mixed together in a dry condition. The microorganisms annd enzymes remain relatively dormant until water is added. In utilizing this substance, a quantity of the substance may be added to the water each time the plant is watered. For example, a teaspoon of the mixture can be added to one quart of water, as pointed out above. This may be done each time that the plants are watered. Due to the fact that the microorganisms and the enzymes immediately become active when exposed to water, it is desirable to mix only enough of the substance with water to take care of any one watering. Any unused substance should be thrown out since it develops a very strong odor due to the activity of the microorganisms. This will not be true, however, of the mixture which has been added to the soil around the potted plants.

As soon as water is added, however, the enzymes and microorganisms become extremely active and proceed to act on the bone meal, Torula yeast, the soybean and the durum wheat flour to break these materials down into a form suitable for utilization by the plant and also to provide a source of nourishment for the microorganisms which rapidly multiply.

As pointed out above, when the bacteria and enzymes are exposed to water, the enzymes and microorganisms become active and break down the various substances. The chelating agent prevents the mixture with the water from settling to the bottom but maintains it distributed through the soil. The microorganisms multiply very rapidly, breaking down the various other substances so as to provide components suitable for use by the plant and producing further enzymes. The amylase attacks the lower molecular weight carbohydrates immediately to give off carbon dioxide. This buffers the soil to a pH of between 6 and 7. If desired, this effect can be greatly increased if from $\frac{1}{2}$ to 2 percent of corn dextrose is included in the soil supplement. The microorganisms and enzymes not only break down the various other substances to provide components suitable for use to the plant, but the enzymes in the mixture and those produced by the microorganisms act to provide a chelating or sequestering effect. The result is that within a short time the water will be retained in the soil, distributed therethrough, and the salts that had previously been deposited on the side of the pot and on the surface of the soil will be distributed through the soil. The enzymes and microorganisms tend to act upon the salts to in turn break them down and produce ions capable of being utilized by the plant. The microorganisms and enzymes will further break down any dead root structure of the plant so that these roots disappear and only the live, active roots remain. The net effect of all these actions is that in place of a dry, hard soil often separated from the edges of the pot, the pot becomes filled with a loose porous soil capable of water retention and in which the microorganisms are very active to perform their various functions such as the breaking down of any dead organic matter in the soil.

Another function they perform is that of producing nitrogen from the protein in the various additives. Certain of the microorganisms such as the Azobacter and Actinomycetes are particularly effective in fixing nitrogen from the air. Thus, a source of nitrogen, in addition to that derived from the protein, is obtained. Phosphorus is also produced by the action of the enzymes and microorganisms on the bone meal and other substances. The action of the enzymes and microorganisms on the various salts produces potassium and various vital trace elements. The effect of the microorganisms on the dead organic matter is, among other functions, to produce colloids and gels to help retain compounds that might otherwise be leached out by water. The overall effect of the great increase in the number of microorganisms is to increase the soil's capacity for storing excess nutrients or inorganic elements and releasing them as needed by the plant.

This process of adding the soil supplement to the water is continued each time that the plants are watered until the soil has again acquired a looser particled texture, the rich dark brown color, and the fresh aroma typical of plowed farmland in the spring. From time to time, throughout the life of the plant, this process should be repeated so as to insure that the micro flora population is maintained. In the meantime, of course, the plant is water in the normal manner.

Instead of adding the soil supplement to the water prior to the application to the potted plant, I have also found that the soil supplement can be added in a dry state to the soil. Water is then added to the soil. The water will carry the soil supplement down through the soil, this action being aided by the chelating agent. The action of the soil supplement when the water is added to the soil around the plant becomes very similar to that described above. Just as when the mixture is added to water prior to being applied to the plant, the enzymes and microorganisms become active and break down the proteins and carbohydrates. From time to time, further water should be added, as is customary in the care of a potted plant. Due to the fact that the improved soil supplement makes the soil more porous, less watering may be required than would be the case otherwise. This is due to greater water retention by the soil. From time to time, particularly with larger potted plants, it is desirable to add more of the soil supplement to the plant. In each case, it is desirable that water be added after the soil supplement is added to the plant in order that the water will carry the soil supplement into the soil and to cause the soil supplement to be active in the manner described above.

It will be seen that I have provided a mixture and method for regenerating soil around potted plants and again establishing a proper biological balance in the soil. It is accomplished as a part of the normal watering process by the addition of my improved soil supplement to the soil from time to time. This may be accomplished either by mixing the same first with water and then adding the aqueous mixture to the soil or it can be accomplished by depositing it directly on the soil and then adding water thereto.

While I have described a specific embodiment for the purposes of illustration, it is to be understood that the scope of the invention is to be limited solely by the appended claims.

I claim:

1. A soil supplement for addition to the soil around a potted plant, said soil supplement comprising:
    a quantity of microorganisms and enzymes in an amount equal to at least 3% of the total quantity of the supplement, said microorganisms being present in an amount equal to at least 1% of the total supplement and said enzymes being present in an amount equal to at least the amount of microorganisms,
    a quantity of materials rich in protein and carbohydrates in an amount equal to at least 75% of the total, and
    a sequestering agent consisting of potassium citrate in an amount equal to from 7 to 15 percent for maintaining the remaining ingredients dispersed through the soil and preventing the settling thereof.

2. The soil supplement of claim 1 in which the quantity of materials rich in proteins and carbohydrates contains durum wheat flour.

3. The soil supplement of claim 1 in which the quantity of materials rich in proteins and carbohydrates includes one or more substances from the group consisting of bone meal, Torula yeast, soybean flour, and durum wheat flour.

4. The soil supplement of claim 1 in which the quantity of materials rich in proteins and carbohydrates contains a substantial amount of durum wheat flour and relatively small amounts of bone meal and Torula yeast in substantially equal amounts.

5. The soil supplement of claim 4 in which the durum wheat flour constitutes approximately 50% of the total supplement and in which the bone meal and Torula yeast are each present in an amount equal to about 15% of the supplement.

6. The soil supplement of claim 1 in which the materials rich in protein and carbohydrates comprises durum wheat flour in an amount equal to about 50% of the total supplement, bone meal and Torula yeast each in an amount equal to about 15% of the total supplement, and soybean flour in an amount equal to about 10% of the total supplement.

7. The soil supplement of claim 1 in which the microorganisms are from the group consisting of Azobacter, Pseudomonadaceae, Actinomycets, Streptomycetaceae, gram negative Chemolithotropics, Bacillaceae, Norcardiaceae, Phycomycetes, Ascomycetes, Basidiomycetes, Fungi Imperfecti, Zygomycetes, and a Nitrofying Bacteria Oxidizing type of microorganism such as Nitrosomonas or Nitrobacter.

8. The soil supplement of claim 1 in which the enzymes are from the group consisting of Cellulase, Hemicellulase, Protease, Amylase, Phenyloxgenase, Peroxygenase, Cytase, Pentosonase, Lipase, and waxolytic enzymes.

9. The soil supplement of claim 1 in which there is approximately 1 to 2% of a 15 to 20 billion cell count per gram of microorganisms from the group consisting of Azobacter, Pseudomonadaceae, Actinomycetes, Streptomycetaceae, gram negative Chemolithotropics, Bacillaceae, Norcardiaceae, Phycomycetes, Ascomycetes, Basidiomycetes, Fungi Imperfecti, Zygomycetes, and a Nitrofying Bacteria Oxidizing type of microorganism such as Nitrosomonas or Nitrobacter, 2 to 10% of enzymes from the group consisting of Cellulase, Hemicellulase, Protease, Amylase, Phenyloxgenase, Peroxygenase, Cytase, Pentosonase, Lipase, and waxolytic enzymes, 5 to 20% of bone meal, 15 to 30% of Torula yeast, from 8 to 15% of potassium citrate, 5 to 15% of soybean flour and 30 to 60% of durum wheat flour.

10. The soil supplement of claim 9 in which the amount of Azobacter and Actinomycetes is about one-fifteenth of the quantity of other microorganisms.

11. The soil supplement of claim 10 in which ½ to 2 percent of corn dextrose is included.

12. The method of maintaining the soil around a potted plant relatively porous which comprises preparing a mixture containing microorganisms and enzymes in a combined amount equal to at least 3% of the total mixture, a relatively large amount of materials rich in proteins and carbohydrates, and a sequestering agent, adding said mixture to the soil along with water, and periodically adding water to said soil when necessary to maintain the soil moist, such periodic addition of said water being accompanied by the addition of said mixture where necessary to maintain the desired porosity of the soil.

13. The method of maintaining the soil around a potted plant relatively porous which comprises preparing a mixture containing microorganisms and enzymes in a conbined amount equal to at least 3% of the total mixture, a relatively large amount of materials rich in proteins and carbohydrates, and a sequestering agent, adding said mixture to water and periodically adding to said soil when necessary to maintain the soil moist a quantity of water with said mixture added thereto.

14. The method of claim 13 in which said mixture is added to said water in the proportion of approximately one teaspoon of said mixture to a quart of water.

15. The method of maintaining the soil around a potted plant relatively porous which comprises preparing a mixture containing microorganisms and enzymes in a combined amount equal to at least 3% of the total mixture, a relatively large amount of materials rich in proteins and carbohydrates, and a sequestering agent, adding said mixture to the soil, adding to said soil a quantity of water to cause said microorganisms and enzymes to become active, periodically thereafter adding to said soil sufficient water to maintain said soil moist, and further adding to said soil from time to time an additional amount of such mixture prior to the application of water thereto.

* * * * *